United States Patent
Matsuzaki

(10) Patent No.: US 10,635,100 B2
(45) Date of Patent: Apr. 28, 2020

(54) AUTONOMOUS TRAVELLING WORK VEHICLE, AND METHOD FOR CONTROLLING AUTONOMOUS TRAVELLING WORK VEHICLE

(71) Applicant: Kubota Corporation, Osaka-shi (JP)

(72) Inventor: Yushi Matsuzaki, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 190 days.

(21) Appl. No.: 15/842,810

(22) Filed: Dec. 14, 2017

(65) Prior Publication Data

US 2018/0210443 A1 Jul. 26, 2018

(30) Foreign Application Priority Data

Jan. 20, 2017 (JP) ................................ 2017-008352

(51) Int. Cl.

| G05D 1/00 | (2006.01) |
|---|---|
| G07C 5/08 | (2006.01) |
| G05D 1/02 | (2020.01) |
| A01B 69/04 | (2006.01) |
| G06K 9/00 | (2006.01) |
| A01B 33/02 | (2006.01) |

(52) U.S. Cl.
CPC ......... G05D 1/0055 (2013.01); A01B 69/008 (2013.01); G05D 1/0088 (2013.01); G05D 1/0212 (2013.01); G05D 1/0246 (2013.01); G06K 9/00255 (2013.01); G07C 5/0808 (2013.01); A01B 33/021 (2013.01); G05D 2201/0201 (2013.01)

(58) Field of Classification Search
CPC .. G05D 1/0055; G05D 1/0212; A01B 69/008; A01L 369/008
USPC .......................................................... 701/28
See application file for complete search history.

(56) References Cited

U.S. PATENT DOCUMENTS 9,120,484 B1 * 9/2015 Ferguson .............. B60W 50/14
9,646,428 B1 * 5/2017 Konrardy ......... G08G 1/096741
(Continued)

FOREIGN PATENT DOCUMENTS

| JP | 06-195121 | 7/1994 |
|---|---|---|
| JP | 09-269829 | 10/1997 |

(Continued)

OTHER PUBLICATIONS

Extended European Search Report for corresponding EP Application No. 17207001.3-1204, dated Jun. 25, 2018.
(Continued)

*Primary Examiner* — Thomas G Black
*Assistant Examiner* — Wae L Louie
(74) *Attorney, Agent, or Firm* — Mori & Ward, LLP

(57) ABSTRACT

An autonomous travelling work vehicle includes at least one obstruction sensor and circuitry. The at least one obstruction sensor is to detect an obstruction in a travel route along which the autonomous travelling work vehicle is configured to travel. The circuitry is configured to determine whether the at least one obstruction sensor operates under a proper operation environment and to determine whether a malfunction occurs in the at least one obstruction sensor if the at least one obstruction sensor is determined to operate under the proper operation environment.

15 Claims, 4 Drawing Sheets

(56) References Cited

U.S. PATENT DOCUMENTS

| | | | | |
|---|---|---|---|---|
| 10,319,039 | B1* | 6/2019 | Konrardy | G06Q 40/08 |
| 2015/0355333 | A1* | 12/2015 | Ono | G01S 7/4972 |
| | | | | 356/4.01 |
| 2016/0084737 | A1 | 3/2016 | Moore et al. | |
| 2016/0282874 | A1 | 9/2016 | Kurata et al. | |
| 2017/0139411 | A1* | 5/2017 | Hartung | G05D 1/0077 |
| 2017/0210386 | A1* | 7/2017 | Kou | B60K 17/35 |
| 2017/0325443 | A1* | 11/2017 | Crinklaw | A01M 7/0014 |
| 2017/0341236 | A1* | 11/2017 | Patrick | G05D 1/0251 |
| 2018/0164808 | A1* | 6/2018 | Prokhorov | B60W 50/08 |
| 2018/0210443 | A1* | 7/2018 | Matsuzaki | G05D 1/0212 |
| 2019/0156150 | A1* | 5/2019 | Krishnan | G06N 20/00 |
| 2019/0187716 | A1* | 6/2019 | Cantrell | G05D 1/0225 |
| 2019/0196020 | A1* | 6/2019 | Aceti | G06K 9/2018 |
| 2019/0225236 | A1* | 7/2019 | Hashimoto | B60W 10/04 |

FOREIGN PATENT DOCUMENTS

| | | |
|---|---|---|
| JP | 2015-222503 | 12/2015 |
| WO | WO 2015/178446 | 11/2015 |

OTHER PUBLICATIONS

European Patent Office Communication for corresponding EP Application No. 17207001.3-1204, dated May 22, 2019.

* cited by examiner

AUTONOMOUS TRAVELLING WORK VEHICLE, AND METHOD FOR CONTROLLING AUTONOMOUS TRAVELLING WORK VEHICLE

CROSS-REFERENCE TO RELATED APPLICATIONS

The present application claims priority under 35 U.S.C. § 119 to Japanese Patent Application No. 2017-008352, filed Jan. 20, 2017. The contents of this application are incorporated herein by reference in their entirety.

BACKGROUND OF THE INVENTION

Field of the Invention

The present invention relates to an autonomous travelling work vehicle and a method for controlling an autonomous travelling work vehicle.

Discussion of the Background

An autonomous travelling work vehicle has an obstruction sensor that detects, in a non-contact manner, an obstruction with which the autonomous travelling work vehicle is likely to collide during travelling. Upon detection of an obstruction, avoidance steering or emergency stop is executed in order to avoid collision with the obstruction. Therefore, autonomous travelling need be prohibited in a case where the obstruction sensor is not normally working.

An autonomous travelling work vehicle disclosed in JP 2015-222503 A has an obstruction sensor or a camera as an obstruction detection unit and checks whether or not an obstruction is present ahead of, behind, and beside a machine body.

Upon detection of an obstruction, a warning is issued, and the autonomous travelling work vehicle is controlled to slow down or stop. When an engine is started by operating a key switch or when a check switch provided on a remote control device or provided close to a driver's seat is operated, whether the obstruction sensor is normal or abnormal is automatically checked before start of autonomous travelling. In this abnormality checking, whether the obstruction sensor is outputting a predetermined output voltage (or outputting an abnormal voltage), short circuit, and disconnection are checked. In a case where the obstruction sensor has an abnormality, the name of the sensor and contents of the abnormality are displayed on a display, and autonomous travelling is not permitted.

SUMMARY OF THE INVENTION

According to one aspect of the present invention, an autonomous travelling work vehicle includes at least one obstruction sensor and circuitry. The at least one obstruction sensor is to detect an obstruction in a travel route along which the autonomous travelling work vehicle is configured to travel. The circuitry is configured to determine whether the at least one obstruction sensor operates under a proper operation environment and to determine whether a malfunction occurs in the at least one obstruction sensor if the at least one obstruction sensor is determined to operate under the proper operation environment.

According to another aspect of the present invention, an autonomous travelling work vehicle includes at least one obstruction sensor and circuitry. The at least one obstruction sensor is to detect an obstruction in a travel route along which the autonomous travelling work vehicle is configured to travel. The circuitry is configured to control autonomous travelling along the travel route, to determine whether or not the at least one obstruction sensor detects an artificial obstruction entering a detection region of the at least obstruction sensor, and to prohibit the autonomous travelling in a case where it is determined that the at least one obstruction sensor does not detect the artificial obstruction.

According to further aspect of the present invention, a method for controlling an autonomous travelling work vehicle, includes determining whether at least one obstruction sensor operates under a proper operation environment, the at least one obstruction sensor being configured to detect an obstruction in a travel route along which the autonomous travelling work vehicle is configured to travel. Whether a malfunction occurs in the at least one obstruction sensor is determined if the at least one obstruction sensor is determined to operate under the proper operation environment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
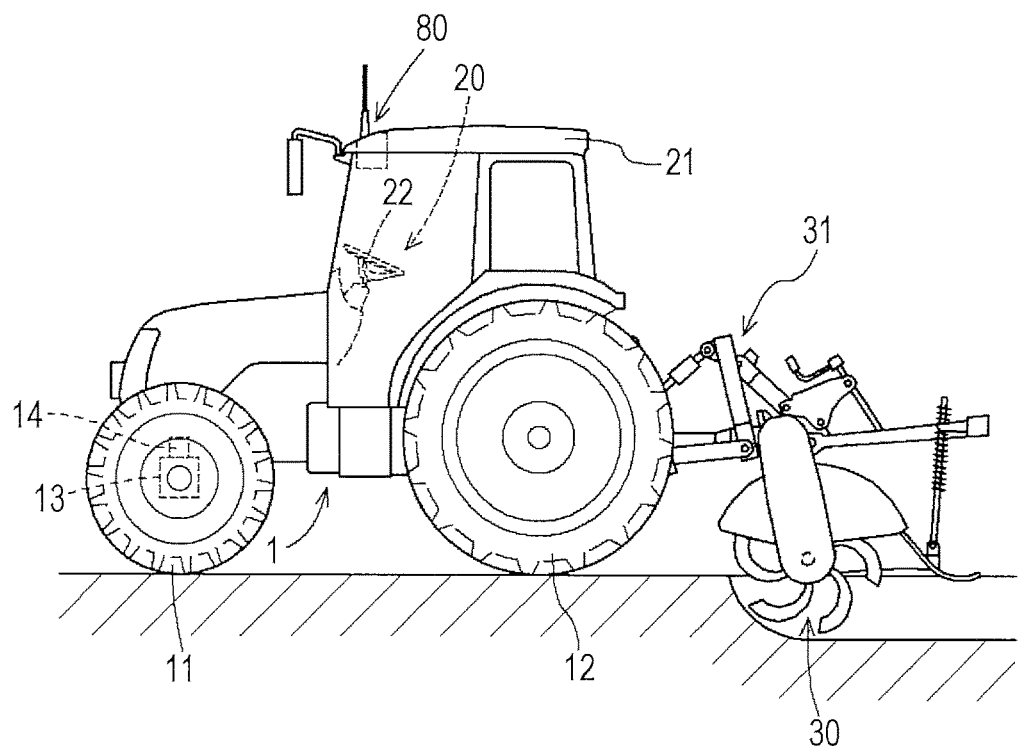
FIG. 1 is a side view of a tractor that is an example of an autonomous working vehicle that performs work while autonomously travelling along a travel route.

The embodiments will now be described with reference to the accompanying drawings, wherein like reference numerals designate corresponding or identical elements throughout the various drawings.

In the autonomous travelling work vehicle disclosed in JP 2015-222503 A, a defective operation of the obstruction sensor is considered to be caused by malfunction of a signal system such as disconnection or short circuit of a signal line, and a state and the like of a sensor signal are checked to determine presence or absence of a defective operation. However, in a case where an obstruction sensor such as an ultrasonic sonar, a laser scanner, or a camera is used, it is difficult to determine, from a state of a sensor signal, presence or absence of a defective operation caused by an external environment factor such as attachment of mud or rainwater onto sound wave or light beam exit and incident openings. Especially in a case of a work vehicle, it is highly likely that mud, dust, and rainwater are attached to an obstruction sensor, and it is therefore important to secure an external environment in which the obstruction sensor properly operates, i.e., a proper operation environment in order to avoid a defective operation of the obstruction sensor caused by an external environment factor. A defective operation of an obstruction sensor caused by an external environment factor is often solved, for example, just by removing an attached object. However, the autonomous travelling work vehicle disclosed in JP 2015-222503 A has a problem that autonomous travelling is promptly prohibited even in a case where such a defective operation occurs. Furthermore, even if a signal system of an obstruction sensor has no problem, there is a risk of failure to properly detect an obstruction because of an inappropriate evaluation system such as a detection threshold value.

In view of such circumstances, there are demands for an autonomous travelling work vehicle that can properly determine whether or not an obstruction sensor is normally operating by also taking into consideration factors other than malfunction of a signal system.

Next, an exemplary embodiment of an autonomous travelling work vehicle according to the present invention will be described below with reference to the drawings. In this exemplary embodiment, the work vehicle is a tractor that performs work and travels in a field (work field) separated by ridges as boundaries. The term "working travelling" used herein includes working while travelling, travelling itself, working itself, a state where at least one of working and travelling, travelling itself, and working itself is being performed, and a state where such travelling working is temporarily stopped.

As illustrated in FIG. 1, this tractor is provided with an operation unit 20 at a center of a vehicle body 1 supported by front wheels 11 and rear wheels 12. At a rear of the vehicle body 1, a work device 30 that is a rotary tilling machine is mounted via a hydraulic lifting mechanism 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual travelling, the front wheels 11 can be steered by operating a steering wheel 22 disposed on the operation unit 20. In a cabin 21 of the tractor, a satellite positioning module 80 configured as a global navigation satellite system (GNSS) module is provided. As a component of the satellite positioning module 80, a satellite antenna for receiving GNSS signals (including GPS signals) is attached at a ceiling area of the cabin 21. An inertial navigation module incorporated with a gyro acceleration sensor and a magnetic director sensor may be combined with the satellite positioning module 80 for complementing satellite navigation. The inertial navigation module may also be provided in a different location from that of the satellite positioning module 80.

Figure 2:
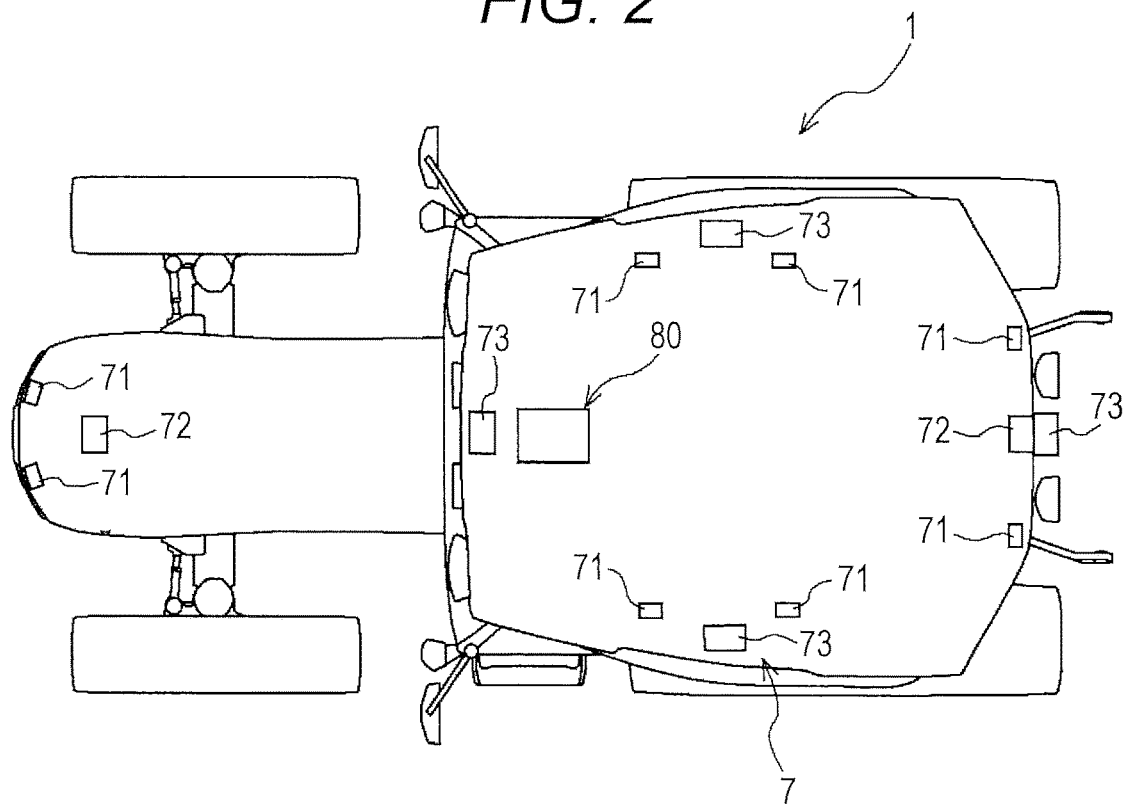
FIG. 2 is a schematic plan view of the tractor illustrating obstruction detection sensors disposed on the tractor.

As schematically illustrated in FIG. 2, the vehicle body 1 of the tractor is provided with obstruction sensors 7 that detect an obstruction to travelling. The obstruction sensors 7 include, as obstruction sensors, ultrasonic sonars 71, laser scanners (lidars) 72, and cameras 73. Two ultrasonic sonars 71 are provided on each of front, rear, left, and right sides of the vehicle body 1. That is, eight ultrasonic sonars 71 in total are provided. The ultrasonic sonars 71 detect an obstruction in almost all surrounding region around the vehicle body 1. A single laser scanner 72 is provided on each of the front and rear sides of the vehicle body 1. That is, two laser scanners 72 in total are provided. The laser scanners 72 detect an obstruction in a backward direction and a forward direction of the vehicle body 1. A single camera 73 is provided on each of the front, rear, left, and right sides of the vehicle body 1. That is, four cameras 73 in total are provided. The cameras 73 photograph all of the surrounding region around the vehicle body 1. In this exemplary embodiment, the cameras 73 are not used just to detect an obstruction around the vehicle body 1. Photographed images output from the four cameras 73 are used as monitoring images as they are or used as an overhead image obtained by a view point conversion process. Furthermore, in a case where the cameras 73 have a face recognition function, attribute information indicating that a face has been recognized is added to data of photographed images output from the camera 73 in a case where a face is recognized in a photographed image.

Figure 3:
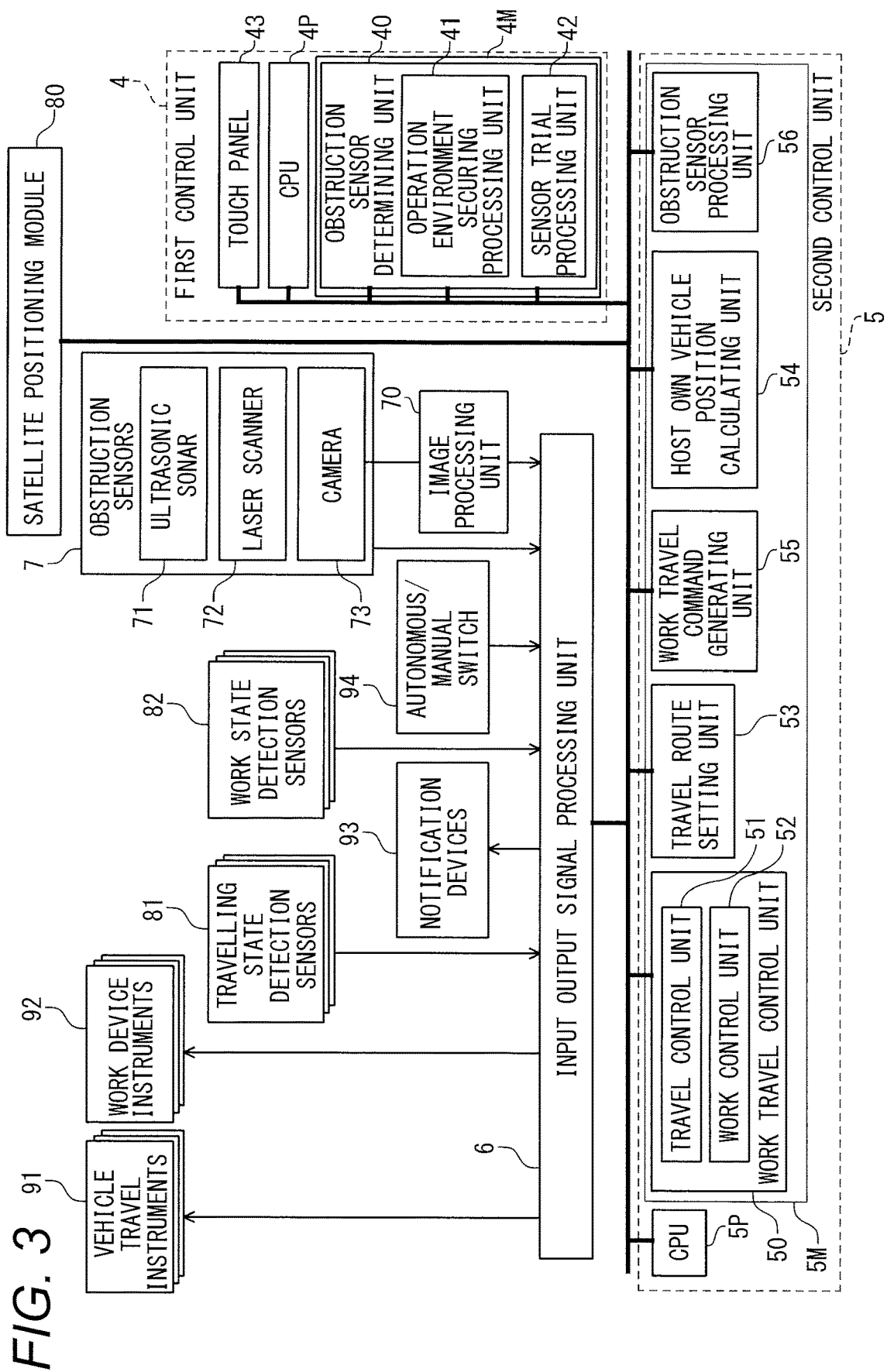
FIG. 3 illustrates an internal structure of the tractor.

FIG. 3 illustrates a control system constructed in this tractor. In the control system according to this exemplary embodiment, a function of determining whether or not the obstruction sensors 7 are normally operating is constructed mainly in a first control unit 4, and a function of controlling working travelling while using a detection result of the obstruction sensors 7 is constructed mainly in a second control unit 5. The first control unit 4, the second control unit 5, and an input output signal processing unit 6 are connected to one another by an on-board LAN. The input output signal processing unit 6 processes input output signals handled in working travelling of a tractor. Furthermore, the satellite positioning module 80 is also connected to the same on-board LAN.

The obstruction sensors 7 are connected to the input output signal processing unit 6. In FIG. 3, the cameras 73 are connected to the input output signal processing unit 6 through an image processing unit 70 that performs processes such as a process for generating a monitoring image from photographed images acquired from the cameras 73. The image processing unit 70 may be constructed in the input output signal processing unit 6 or may be constructed in the cameras 73. The face recognition process may be performed in the image processing unit 70.

In addition, vehicle travel instruments 91, work device instruments 92, a notification device 93, an autonomous/manual switch 94, travelling state detection sensors 81, and work state detection sensors 82 are connected to the input output signal processing unit 6. The vehicle travel instruments 91 include the steering motor 14 and control instruments attached to a transmission mechanism and an engine unit controlled for vehicle travelling. The work device instruments 92 include control instruments for driving the work device 30 and the lifting mechanism 31. The notification device 93 includes, a display, a lamp, a speaker, and the like for giving an alert on work and travel to a driver and a supervisor. The autonomous/manual switch 94 is a switch for selecting either an autonomous travel mode for travelling with autonomous steering or a manual steering mode for travelling with manual steering. For example, operating the autonomous/manual switch 94 while the work vehicle is travelling in the autonomous steering mode causes the work vehicle to switch to travelling with manual steering, and operating the autonomous/manual switch 94 while the work vehicle is travelling with manual steering causes the work vehicle to switch to travelling with autonomous steering. The travelling state detection sensors 81 include sensors for detecting travel states such as a steering angle, an engine speed, and a transmission state. The work state detection sensors 82 include use state detection sensors that detect use states such as orientation, a height above ground, and a use width of the work device 30.

The input output signal processing unit 6 includes a communication unit (not illustrated). The communication unit exchanges data with an external computer in conformity to a wireless communication standard or a wired communication standard. Examples of the external computer include a control computer constructed in a control center or another facility in a remote location, and a tablet computer or a smartphone (mobile phone) held by the driver or the supervisor.

The first control unit 4 includes a touch panel 43 that functions as a graphical user interface and an obstruction sensor determining unit 40 that performs a sensor determining process for determining whether the obstruction sensors 7 are normal or abnormal. More specifically, the first control unit 4 includes a CPU (circuitry) 4P and a memory 4M. A program of the obstruction sensor determining unit 40 is stored in the memory 4M and executed by the CPU 4P to perform the sensor determining process. Although the ultrasonic sonars 71, the laser scanners 72, and the cameras 73 are provided as the obstruction sensors 7 in this exemplary embodiment, a common term "obstruction sensors" is used in a case where they need not be distinguished. An operation environment securing processing unit 41 and a sensor trial processing unit 42 are constructed in the obstruction sensor determining unit 40 in order to perform the sensor determining process. The operation environment securing processing unit 41 performs an operation environment securing process for securing a proper operation environment for a normal operation of the obstruction sensors. In an example of the operation environment securing process, a user (a driver or a worker) is instructed to secure an operation environment, for example, through an input output device for a touch panel, and the operation environment securing processing unit 41 confirms that the operation environment has been secured through a user's an input operation indicating completion of the securing operation. The sensor trial processing unit 42 performs a sensor trial process for checking whether the obstruction sensors are normal or abnormal under the proper operation environment by trial. In an example of the sensor trial process, a user (a driver or a worker) is instructed to enter a detection region of the obstruction sensors, for example, through the input output device for a touch panel, and the sensor trial processing unit 42 confirms that the obstruction sensors are normally operating when the obstruction sensors detect the user as an obstruction. The obstruction sensor determining unit 40 also has a well-known function of performing a signal line determining process for checking short circuit and disconnection of a signal line of the obstruction sensors.

The second control unit 5 includes a work travel control unit 50, a travel route setting unit 53, an own vehicle position calculating unit 54, a work travel command generating unit 55, and an obstruction sensor processing unit 56. The travel route setting unit 53 loads a travel route that is a target route for autonomous travelling into a memory in a readable manner. The travel route may be generated on a tractor side or may be generated on another computer and then downloaded into the second control unit 5. The own vehicle position calculating unit 54 calculates a coordinate position of the vehicle body 1 on a map based on positioning data obtained from the satellite positioning module 80 such as a GPS. The work travel command generating unit 55 finds a displacement amount between the own vehicle position calculated by the own vehicle position calculating unit 54 and the travel route set by the travel route setting unit 53 and generates a travelling command (including a steering command and a vehicle speed command) to reduce this displacement amount. More specifically, the second control unit 5 includes a CPU (circuitry) 5P and a memory 5M. Programs of the work travel control unit 50, the travel route setting unit 53, the own vehicle position calculating unit 54, the work travel command generating unit 55, and the obstruction sensor processing unit 56 are stored in the memory 5M and executed by the CPU 5P to perform the above functions.

The work travel control unit 50 includes a travel control unit 51 and a work control unit 52. The travel control unit 51 has an autonomous travel control function (autonomous travel mode) and a manual travel control function (manual travel mode). When the autonomous travel mode is selected, the travel control unit 51 gives a control signal to the vehicle travel instruments 91 based on the travelling command received from the work travel command generating unit 55. The work control unit 52 gives a control signal to the work device instruments 92 based on a work command received from the work travel command generating unit 55. When the manual travel mode is selected, manual travelling based on a driver's operation of the steering wheel 22 is performed. Similarly, the work control unit 52 has an autonomous work control function for causing the work device instruments 92 to autonomously operate and a manual work control function of manually controlling the work device instruments 92 by using various operating tools.

The obstruction sensor processing unit 56 can perform different processes based on a detection result of the obstruction sensors 7 in three situations, i.e., before the start of autonomous travelling, during autonomous travelling, and during manual travelling. Before the start of autonomous travelling, the obstruction sensor processing unit 56 gives a permission command to permit autonomous travelling to the work travel control unit 50 in a case where a normal operation of the obstruction sensors is confirmed (the obstruction sensors are determined to be normal) based on a determination result output from the obstruction sensor determining unit 40. The obstruction sensor processing unit 56 gives a prohibition command to prohibit autonomous travelling to the work travel control unit 50 in a case where a normal operation of the obstruction sensors is not confirmed (the obstruction sensors are determined to be abnormal). During autonomous travelling and manual working, when an obstruction sensor detects an obstruction in a travelling direction of the vehicle body 1, a stopping command to stop the vehicle body 1 or a slowdown command to decrease a vehicle speed is given to the work travel control unit 50. A slowdown command to decrease a vehicle speed may be given to the work travel control unit 50 even in a case where an obstruction is detected in a surrounding region other than the travelling direction of the vehicle body 1. When some sort of command is given from the obstruction sensor processing unit 56 to the work travel control unit 50, a notification about contents of the command is given through the notification device 93. During manual travelling, in principle, when an obstruction is detected by the obstruction sensors 7, a notification about the detection is given, but travelling itself is permitted. However, in a case where an obstruction is detected ahead of the vehicle body 1 in the travelling direction, emergency stop is activated.

Figure 4:
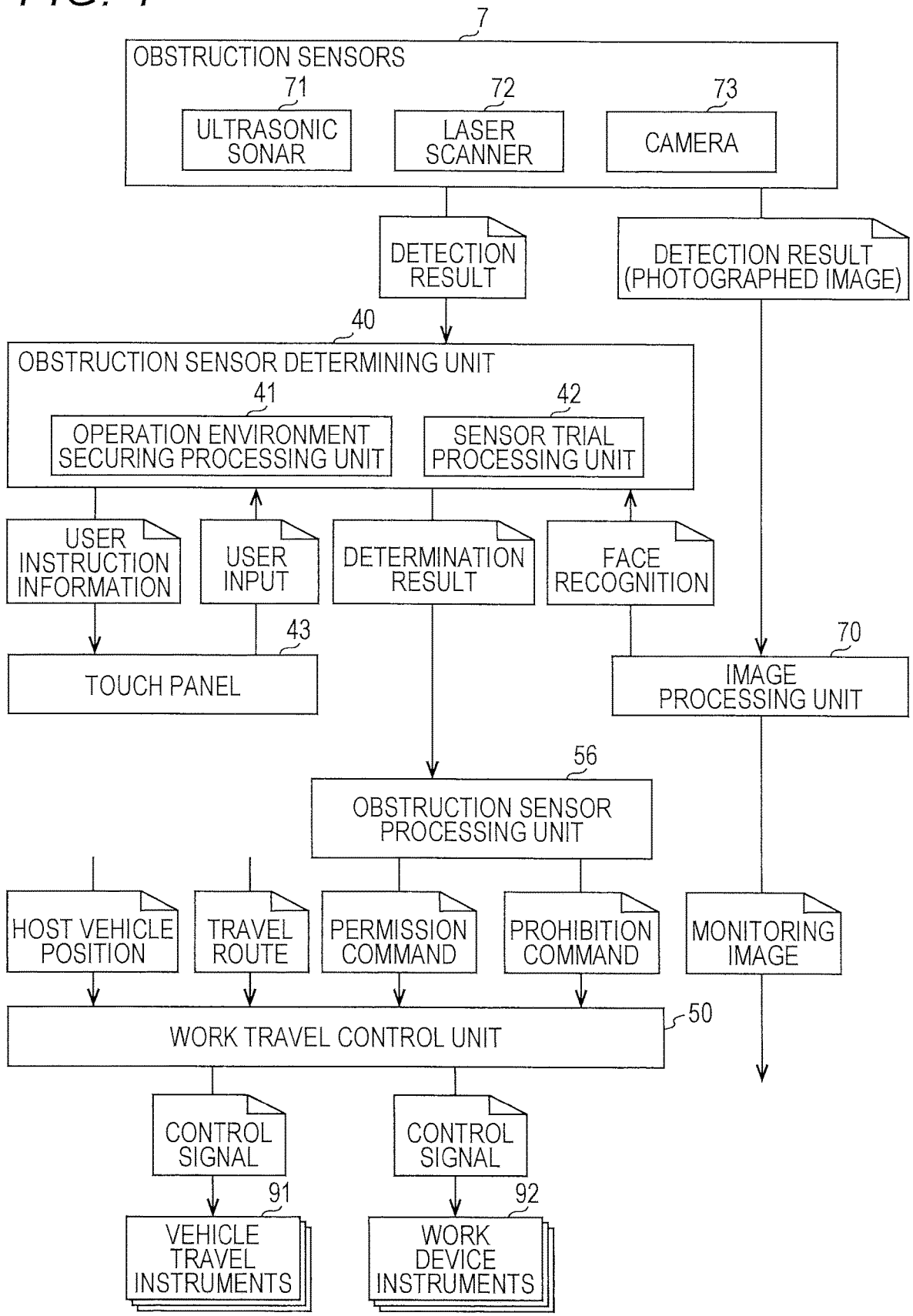
FIG. 4 is an explanatory view illustrating a flow of control in a sensor determining process.

Next, a flow of information in the sensor determining process performed in the obstruction sensor determining unit 40 to determine whether or not the obstruction sensors 7 are normally operating is described by using the laser scanners 72 and the cameras 73 as an example with reference to FIG. 4. In this sensor determining process, the ultrasonic sonars 71 are handled in a similar manner to the laser scanners 72.

In this exemplary embodiment, the sensor determining process is activated when a main key is turned on. When the sensor determining process is activated, the operation environment securing process is performed by the operation environment securing processing unit 41, and a message requesting an operation environment securing operation such as cleaning laser emission openings of the laser scanners 72 or lenses of the cameras 73 is displayed on the touch panel 43 as an example of the notification process. A user (e.g., a driver or a supervisor) performs the operation environment securing operation based on the displayed contents and then performs a user input operation indicating completion of the operation environment securing operation through the touch panel 43. The operation environment securing processing unit 41 confirms that a proper operation environment has been secured by this user input operation. Next, the sensor trial process is performed by the sensor trial processing unit 42, and a message requesting that a user enters paths of laser beams emitted from the laser scanners 72 (a detection region of the obstruction sensors) (artificial entry of an obstruction) or field of regions of the cameras 73 is displayed on the touch panel 43. In the sensor trial process, the obstruction sensors 7 are operating, and therefore when the user who entered the paths of laser beams (a detection region of the obstruction sensors) or an object carried by the user is detected as an obstruction, a result of the detection is returned to the sensor trial processing unit 42 as a normal operation confirmation signal. In a case where data of photographed images obtained from the cameras 73 includes attribute information indicating that a face of a user who has entered the field of regions has been recognized, this attribute information becomes normal operation confirmation information of the cameras 73. In this way, the sensor trial processing unit 42 can confirm a normal operation through an actual trial of the obstruction sensors. Since the obstruction sensors 7 are disposed so as to cover the whole region around the tractor, the user can complete the sensor trial process by going around the tractor. The obstruction sensor determining unit 40 can perform a signal line determining process for checking short circuit and disconnection of a signal line of the obstruction sensors at any timing.

When the obstruction sensor determining unit 40 outputs a determination result indicating that the obstruction sensors 7 are normally operating through the operation environment securing process and the sensor trial process, the obstruction sensor processing unit 56 gives a permission command to the travel control unit 51 of the work travel control unit 50. In this way, autonomous travelling is permitted. When the obstruction sensor determining unit 40 outputs a determination result indicating that a normal operation of the obstruction sensors 7 is not confirmed, the obstruction sensor processing unit 56 gives a prohibition command to the travel control unit 51 of the work travel control unit 50. In this way, autonomous travelling is prohibited.

Next, an example of a flow of control from the sensor determining process to the start of travelling of the tractor is described with reference to the flowchart of FIG. 5.

When a control routine for start of travelling is activated, whether or not the main key of the tractor is on is checked (#01). In a case where the main key is off (No in #01), this routine is finished. In a case where the main key is on (Yes in #01), which of the autonomous travelling mode and the manual travelling mode is set is checked (#02). In a case where the autonomous travelling mode is set (Yes in #02), a period T elapsed from an immediately preceding time at which the main key was turned off is calculated (#03). The elapsed period T is compared with a threshold value H (#04). This threshold value H is a period set in order to avoid repetition of an unnecessary sensor determining process that occurs when the main key is turned off and on repeatedly for a short period.

In a case where the elapsed period T is longer than the threshold value H, the operation environment securing process starts, and a user is instructed to perform an operation for securing an operation environment through the touch panel 43 (#05). The user performs the operation for securing an operation environment based on this instruction. When the operation for securing an operation environment is completed and the user inputs completion of the operation through the touch panel 43, the operation environment securing processing unit 41 determines that it has been confirmed that the operation environment has been secured (Yes in #06), and then the sensor trial process for determining whether or not the obstruction sensors are normally operating by trial starts (#07).

The sensor trial process in this exemplary embodiment is performed as follows:
(1) A user is requested to go around the tractor by displaying a message "press a trial operation completion button after going around the tractor" on the touch panel 43.
(2) All obstruction sensors are caused to operate in a trial mode.
(3) Whether all of the obstruction sensors have detected an obstruction (user) is checked when the user presses the trial operation completion button.
(4) In a case where the all of the obstruction sensors have detected an obstruction (user), it is determined that a sensor operation state is normal. In a case where one or more of the obstruction sensors has not detected an obstruction (user), it is determined that a sensor operation state is not normal, and the obstruction sensor(s) that has(have) not detected an obstruction (user) is displayed on the touch panel 43.
(5) A result of the determination is output (#08).

The result of the determination is checked (#09), and in a case where the result of the determination indicates a normal operation (Yes in #09), the obstruction sensor processing unit 56 gives a permission command to the work travel control unit 50 (#10). In this way, autonomous travelling starts (#11). In a case where the result of the determination does not indicate a normal operation (No in #09), the obstruction sensor processing unit 56 gives a prohibition command to the work travel control unit 50 (#12). As a result, autonomous travelling is not started, and the routine returns to step #01. When a prohibition command is issued, autonomous travelling is prohibited, and therefore the user switches the travelling mode to manual travelling. Alternatively, it is also possible to employ an arrangement in which the travelling mode is automatically switched to manual travelling. When the travelling mode is switched to the manual travelling mode (NO in step #02), manual travelling is started (#13), and therefore the tractor can be moved to a place where maintenance and inspection of the obstruction sensors 7 are possible. That is, output of a prohibition command is suspended during manual travelling.

In a case where the elapsed period T is equal to or less than the threshold value H in step #04 (No in #04), whether or not a last result of sensor determination indicates a normal operation is checked (#14), and in a case where the last result of the sensor determination indicates a normal operation (Yes in #14), step #10 is performed, and a permission command is given to the work travel control unit 50 without performing a new sensor determining process. In a case where the last result of the sensor determination does not indicate a normal operation (No in #14), step #01 is performed again. In a case where a period elapsed from an immediately preceding timing at which the main key is turned off to a subsequent time at which the main key is turned on is equal to or less than a threshold value (a predetermined period set so that mud or the like is unlikely to be attached), a last result of determination indicating a normal operation in the sensor determination process is maintained. In a case where a last result of the sensor determination does not indicate a normal operation, step #05

Figure 5:
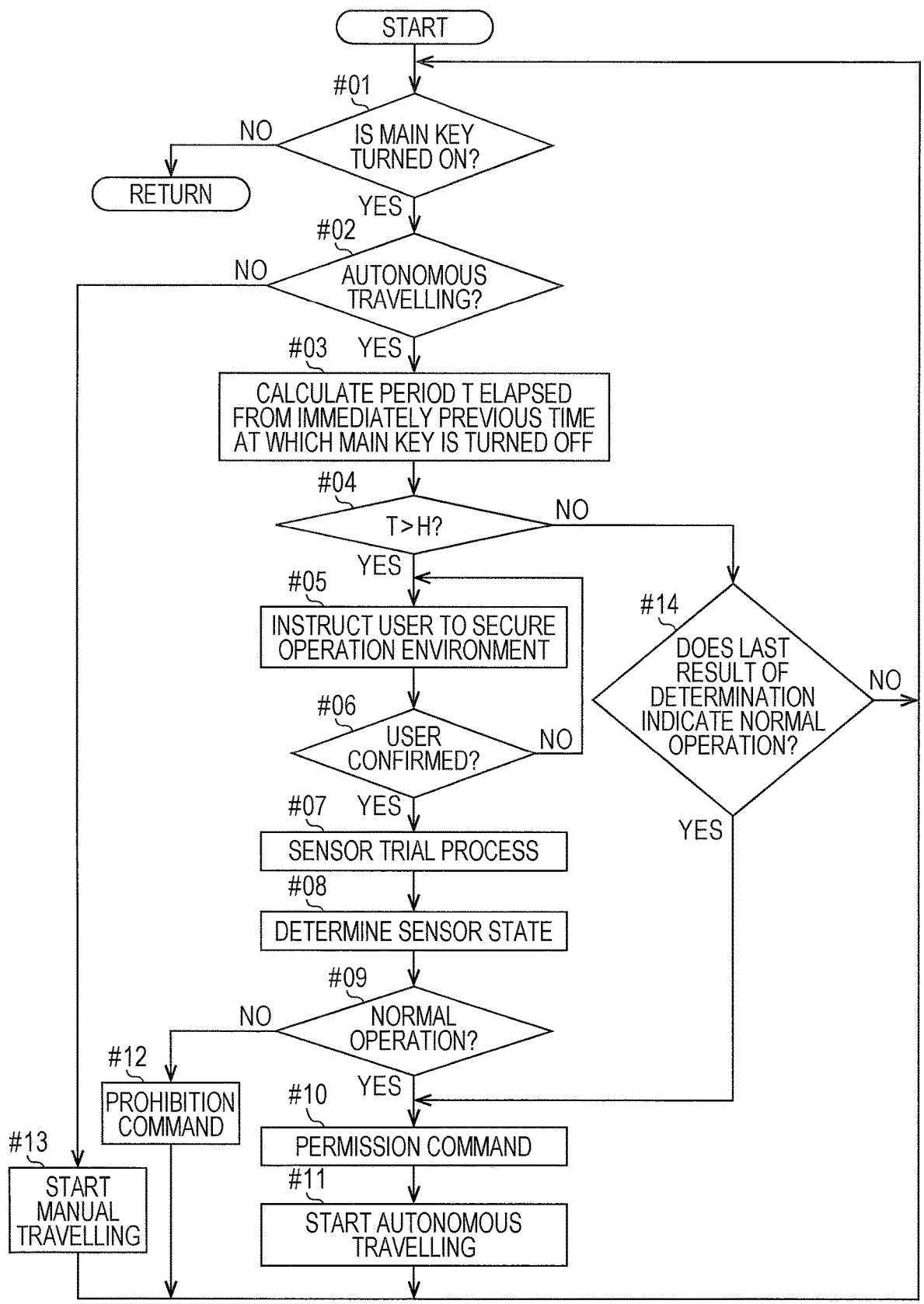
FIG. 5 is a flowchart illustrating an example of the sensor determining process.

Other Embodiments (1) In the example illustrated in the flowchart of FIG. 5, the sensor trial process is performed after the operation environment securing process. However, in a case where the operation environment securing process is unnecessary, only the sensor trial process may be performed while the operation environment securing process is omitted. Alternatively, only the operation environment securing process may be performed while omitting the sensor trial process.

(2) In the flowchart illustrated in FIG. 5, the sensor determining process is performed at a timing at which the main key is turned on. Alternatively, it is possible to employ an arrangement in which the sensor determining process is performed at any timing or upon receipt of an instruction from an outside.

(3) Although a tractor equipped with a tilling machine is taken as an example of a work vehicle in the above exemplary embodiment, the embodiment of the present invention is also applicable to a tractor equipped with a work device 30 other than a tilling machine, farm machines such as a combine harvester and a rice planting machine, and construction machines.

(4) In the above exemplary embodiment, the first control unit 4, the second control unit 5, and the input output signal processing unit 6 are connected through an on-board LAN and are provided in the tractor. However, it is also possible to employ an arrangement in which the first control unit 4 is a tablet computer, a notebook computer, a smartphone, or the like that is carried by a supervisor and wirelessly exchanges data with the control system of the tractor. Furthermore, the first control unit 4 may be configured as a computer that is placed in a control center in a remote location or at user's home or the like, and is connected to the control system of the tractor through an Internet line.

(5) The way in which the functional units in the functional block diagram illustrated in FIG. 3 are divided is an example for easy understanding of description, and various functional units can be freely unified and a single functional unit can be freely divided into a plurality of units. More specifically, the CPUs 4P and 5P can be integrated into a single CPU or divided into more than three CPUs. The memories 4M and 5M can be integrated into a single memory or divided into more than three memories.

INDUSTRIAL APPLICABILITY

The embodiment of the present invention is applicable to an autonomous travelling work vehicle for working and travelling along a travel route.

An autonomous travelling work vehicle according to the embodiment of the present invention to autonomously travel along a travel route includes: a travel control unit to control autonomous travelling; one or more obstruction sensors to detect an obstruction to travelling; an obstruction sensor determining unit to perform a sensor determining process for determining whether or not the obstruction sensors are normally operating; and an obstruction sensor processing unit to output a prohibition command to prohibit autonomous travelling controlled by the travel control unit in a case where the obstruction sensor determining unit determines that the obstruction sensors are not normally operating, wherein the sensor determining process includes an operation environment securing process for securing a proper operation environment for a normal operation of the obstruction sensors.

According to this configuration, a sensor determining process for determining whether or not the obstruction sensors are normally operating starts from an operation environment securing process. The operation environment securing process is a process for checking whether or not a condition of an obstruction sensor operation environment needed for a normal operation of the obstruction sensors is met. For example, whether or not sensor beam exit opening and incident opening are blocked, whether or not a direction of emission of a sensor beam is deviated, or whether or not a hindering member is present on a path of a sensor beam in a case where the obstruction sensors are ones using a sensor beam such as ultrasonic sonars or laser scanners. Alternatively, in a case where the obstruction sensors are cameras, for example, whether or not a lens is fogged up or whether or not a foreign substance is attached to a lens is checked. Unless such a condition of an obstruction sensor operation environment is met, the obstruction sensors cannot operate normally even if a signal system of the obstruction sensors is normal. Therefore, first, a defective operation of the obstruction sensors caused by an operation environment that is an external factor is avoided by securing an operation environment through this operation environment securing process.

A main role of the operation environment securing process is not to find out malfunction of the obstruction sensors themselves but to remove an external factor that is inconvenient for a normal operation of the obstruction sensors in an environment surrounding the obstruction sensors. User's maintenance and inspection are important to remove such inconvenience in an operation environment (surrounding environment), for example, attachment of a foreign substance. However, a user tends to forget such maintenance and inspection. In view of this, in one preferable exemplary embodiment of the present invention, the operation environment securing process includes a notification process for notifying a user of an instruction to secure the proper operation environment and a confirmation process for receiving, from the user, information indicating that the proper operation environment has been secured. According to this configuration, when the operation environment securing process is started, a user is given an instruction to secure a proper operation environment for the obstruction sensors (e.g., remove a foreign substance attached to the obstruction sensors), and the user performs an operation for securing the proper operation environment based on this instruction. In a case where contents of this instruction are stored in advance and selected automatically in accordance with a season or a characteristic of a work place or selected based on a request from a control center or a supervisor, the user can be conveniently notified of a proper instruction according to a situation. The user who has performed the operation for securing a proper operation environment based on this instruction inputs completion of the operation through an input operation device such as a touch panel. Thereby, a control system recognizes that the operation environment has been secured.

Even in a case where sensor beam exit opening and incident opening are brought into a good condition by removal of a foreign substance attached to the obstruction sensors, detection of an obstruction may become unstable, for example, because of mist, rain, or smoke. In order to solve such a problem, it is effective to examine whether or not the obstruction sensors detect an actual obstruction by trial. In view of this, in one preferable exemplary embodiment of the present invention, the sensor determining process further includes a sensor trial process for determining whether or not the obstruction sensors are normally operating under the proper operation environment by trial.

Conventionally, a dummy piece is provided at a corner of a detection region of an obstruction sensor in order to determine whether or not the obstruction sensor is normally operating by actual trial. In this case, however, the dummy piece itself reduces the detection region. Furthermore, this is not effective for solution of a problem that detection of an obstruction becomes unstable, for example, because of mist, rain, or smoke. In view of this, in one preferable exemplary embodiment of the present invention, in the sensor trial process, it is determined that the obstruction sensors are normally operating in a case where an obstruction artificially brought into a detection region of the obstruction sensors is detected. This makes sure that the obstruction sensors detect an obstruction, thereby enabling safe autonomous travelling. Also in this case, in a case where contents of an instruction given to a user in this sensor trial process are selected automatically or selected based on a request from a control center or a supervisor, the user can conveniently be notified of a proper instruction according to a situation. Furthermore, in a case where the user is notified, by a display such as a touch panel, a buzzer, or a lamp, of recognition by a control system of a work vehicle that it has been determined in the sensor trial process that the obstruction sensors are normally operating, the user feels safe to proceed to a next operation.

In a case where the obstruction sensors are configured by cameras and where an obstruction is detected based on photographed images acquired from the cameras, it can be confirmed that the obstruction sensors (cameras) are normally operating when it is confirmed that an obstruction that has entered field of views of the cameras can be detected. In view of this, in one preferable exemplary embodiment of the present invention, the obstruction sensors are cameras having a face recognition function; and in the sensor trial process, it is determined that the cameras are normally operating in a case where a face of a person that enters field of views of the cameras is recognized by the cameras. According to this configuration, it can be determined that the obstruction sensors (cameras) are normally operating in a case where the cameras recognize a face when a user stands in front of the cameras.

Conventional checking of short circuit and disconnection of a signal line is also important to determine whether or not the obstruction sensors themselves are normally operating. In view of this, in one preferable exemplary embodiment of the present invention, the sensor determining process includes a signal line determining process for detecting disconnection and short circuit of a signal line of the obstruction sensors.

The sensor determining process performed by the obstruction sensor determining unit is preferably performed when the main key is turned on. However, in a case where the main key is turned off and on repeatedly in a short period, it is annoying that the sensor determining process for determining an operation of the obstruction sensors is activated every time the main key is turned on. In order to avoid this problem, in one preferable exemplary embodiment of the present invention, the sensor determining process performed by the obstruction sensor determining unit is performed when a main key is turned on; and in a case where a predetermined period from an immediately preceding time at which the main key is turned off to a subsequent time at which the main key is turned on, a last result of determination indicating a normal operation in the sensor determining process is maintained while the sensor determining process is omitted.

An abnormality of an obstruction sensor that plays a role of eyes of a driver during autonomous travelling poses a significant problem in autonomous travelling. However, during manual travelling, a driver can visually confirm an obstruction, and therefore manual travelling can be permitted during occurrence of an abnormality of an obstruction sensor. In view of this, in one preferable exemplary embodiment of the present invention, output of the prohibition command from the obstruction sensor processing unit is suspended during manual travelling. In other words, a condition for autonomous travelling is that the obstruction sensors are normally operating.

A defective operation caused by an external environment factor such as attachment of mud or rainwater to the obstruction sensors is sometimes less likely to occur, for example, depending on characteristics of a work place, characteristics of travelling working, or characteristics of a work device. In such cases, the sensor trial process is more important than the operation environment securing process. In view of this, another autonomous travelling work vehicle according to the embodiment of the present invention includes: a travel control unit to controls autonomous travelling; one or more obstruction sensors to detect an obstruction to travelling; an obstruction sensor determining unit to perform a sensor determining process for determining whether or not the obstruction sensors are normally operating; and an obstruction sensor processing unit to output a prohibition command to prohibit autonomous travelling controlled by the travel control unit in a case where the obstruction sensor determining unit determines that the obstruction sensors are not normally operating, wherein the sensor determining process includes a sensor trial process for determining that the obstruction sensors are normally operating in a case where an obstruction artificially brought into a detection region of the obstruction sensors is detected. This makes it possible to determine a detection state of the obstruction sensors with certainty even in a situation where detection of an obstruction is unstable, for example, because of mist, rain, or smoke.

Obviously, numerous modifications and variations of the present invention are possible in light of the above teachings. It is therefore to be understood that within the scope of the appended claims, the invention may be practiced otherwise than as specifically described herein.

What is claimed is:

1. An autonomous travelling work vehicle comprising:
at least one obstruction sensor to detect an obstruction in a travel route along which the autonomous travelling work vehicle is configured to travel; and
circuitry configured to
determine whether there is no external factor which disturbs an operation of the at least one obstruction sensor and which is other than a malfunction in the at least one obstruction sensor and in an electrical line connected to the at least one obstruction sensor, and
determine whether the malfunction occurs if it is determined that there is no external factor.

2. The autonomous travelling work vehicle according to claim 1, wherein the circuitry is configured to control the autonomous travelling work vehicle to autonomously travel along the travel route in a case where it is determined that the malfunction does not occur.

3. The autonomous travelling work vehicle according to claim 1, wherein the circuitry is further configured to
notify a user of an instruction to confirm that there is no external factor, and
receive, from the user, information indicating that it is confirmed that there is no external factor.

4. The autonomous travelling work vehicle according to claim 1, wherein the circuitry is configured to determine whether or not the malfunction occurs by trial.

5. The autonomous travelling work vehicle according to claim 4, wherein
the circuitry is configured to determine whether or not the malfunction occurs by determining whether the at least one obstruction sensor detects an artificial obstruction brought into a detection region of the at least one obstruction sensor.

6. The autonomous travelling work vehicle according to claim 4, wherein
the at least one obstruction sensor includes cameras having a face recognition function, and
the circuitry is configured to determine whether or not the malfunction occurs by determining whether the cameras recognize a face of a person who enters field of views of the cameras.

7. The autonomous travelling work vehicle according to claim 4,
the circuitry is further configured to detect disconnection and short circuit of the electrical line.

8. The autonomous travelling work vehicle according to claim 1, wherein the circuitry is configured to determine whether there is no external factor when a main key is turned on; and
wherein the circuitry is configured to omit determining whether there is no external factor in a period from an immediately preceding time at which the main key is turned off to a subsequent time at which the main key is turned on.

9. The autonomous travelling work vehicle according to claim 1, wherein the circuitry is configured to suspend determining whether there is no external factor while the autonomous travelling work vehicle conducts manual travelling.

10. The autonomous travelling work vehicle according to claim 1, wherein the circuitry is configured to
control autonomous travelling along the travel route,
determine whether or not the at least one obstruction sensor detects an artificial obstruction entering a detection region of the at least obstruction sensor, and
prohibit the autonomous travelling in a case where it is determined that the at least one obstruction sensor does not detect the artificial obstruction.

11. The autonomous travelling work vehicle according to claim 1, wherein the circuitry is configured to determine that there is no external factor when a substance to disturb the operation of the at least one obstruction sensor is not attached to the at least one obstruction sensor.

12. The autonomous travelling work vehicle according to claim 1, wherein the at least one obstruction sensor is configured to emit a sensor beam.

13. The autonomous travelling work vehicle according to claim 12, wherein the at least one obstruction sensor includes an ultrasonic sonar or a laser scanner.

14. The autonomous travelling work vehicle according to claim 1, wherein the at least one obstruction sensor includes a camera.

15. A method for controlling an autonomous travelling work vehicle, comprising:
determining whether there is no external factor which disturbs an operation of at least one obstruction sensor and which is other than a malfunction in the at least one obstruction sensor and in a signal line of the at least one obstruction sensor, the at least one obstruction sensor being configured to detect an obstruction in a travel route along which the autonomous travelling work vehicle is configured to travel; and
determining whether the malfunction occurs if it is determined that there is no external factor.

* * * * *